Patented May 19, 1942

2,283,337

UNITED STATES PATENT OFFICE 2,283,337

VULCANIZATION OF RUBBER

Arthur M. Neal, Wilmington, Del., and Bernard M. Sturgis, Pitman, N. J., assignors to E. I. du Pont de Nemours & Company, Wilmington, Del., a corporation of Delaware No Drawing. Application July 25, 1940, Serial No. 347,475

28 Claims. (Cl. 260—786)

This invention relates to the vulcanization of rubber and more particularly to new combinations of accelerators for the vulcanization of rubber.

It has been proposed to accelerate the vulcanization of rubber with a combination of accelerators of which one is designated the primary accelerator and the other is designated a secondary accelerator. The purpose of the secondary accelerator is generally to activate the primary accelerator. The use of secondary accelerators, as activators for acidic type primary accelerators such as the mercapto-thiazoles, has presented particularly difficult problems due to the tendency of such combinations to prevulcanize or "scorch" the rubber during processing operations. This is particularly true when it is attempted to use a dithiocarbamate as the secondary accelerator. In general, it has been found impossible to use a dithiocarbamate accelerator as a secondary accelerator with an acidic primary accelerator, such as the mercapto-thiazoles and particularly 2-mercapto-benzothiazole, because of the great activity of such combinations of accelerators. Generally, such combinations of dithiocarbamates and mercapto-thiazoles render the rubber incapable of being processed due to its tendency to prevulcanize or scorch. Furthermore, combinations of dithiocarbamates with mercapto-thiazoles and other similar acidic accelerators have been found to impart inferior physical properties to the rubber. The resulting vulcanizates are generally poor in resistance to abrasion and in resistance to aging. Further, such combinations of accelerators usually cause bad reversion of the rubber at the longer cures, which is accompanied by a loss in tensile strength and a deterioration of the physical properties in general.

It is an object of the present invention to provide an improved method of vulcanizing rubber. Another object is to provide vulcanized rubber of improved properties. A further object is to improve the vulcanization of rubber by employing, as accelerators therein, new combinations of accelerators which are sufficiently safe at processing temperatures for commercial utilization and which are at the same time very active at normal vulcanization temperatures. A still further object is to provide a new combination of accelerators for the vulcanization of rubber which produces vulcanized rubber of improved properties. Other objects are to provide new compositions of matter and to advance the art. Still other objects will appear hereinafter.

The above and other objects may be accomplished in accordance with our invention, which comprises employing, as accelerators for the vulcanization of rubber, a 2-mercapto-thiazoline accelerator, as a primary accelerator, and an accelerating ester of a dithiocarbamic acid, as a secondary accelerator. We have found that, when such accelerators are employed together for accelerating the vulcanization of rubber, novel results are obtained, which are different than would be expected from the results which have been obtained when it has been attempted to employ the dithiocarbamates with mercapto-thiazoles, such as 2-mercapto-benzothiazole, and similar acidic type accelerators. We have found that the 2-mercapto-thiazoline accelerators can be activated with accelerating esters of dithiocarbamic acids, so that stocks will be obtained, which can be processed safely but which give a very fast cure with a flat curing curve at the usual vulcanization temperatures, producing vulcanizates possessing exceptionally good moduli and tensile properties. In general, the curing curves show a remarkable plateau effect and the vulcanizates show no reversion, the physical properties standing up well on the longer cures. Moreover, rubber, vulcanized by the joint employment of the accelerators of our invention, shows remarkable resistance to deterioration. In particular, it is resistant to that deterioration normally caused by exposure to high temperatures. Vulcanized rubber compounds, prepared in accordance with our invention, also possess excellent resistance to abrasion, excellent resistance to flex-cracking and excellent resistance to tear, both at ordinary atmospheric temperatures and at higher temperatures. The tensiles, determined at 100° C., are excellent.

The esters of dithiocarbamic acids of our invention may be represented by the formula

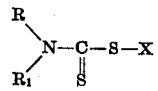

wherein X represents an organic ester forming group, R represents hydrogen or an organic radical and R₁ represents an organic radical. While either or both of R and R₁ may represent aromatic radicals, preferably, at least one of R and R₁ represents an aliphatic and, particularly, an alkyl radical. We generally prefer that R and R₁ each represents an aliphatic and, specifically, an alkyl radical. We particularly prefer that R and R₁ together represent a carbon chain having the terminal carbon atoms of the chain directly bonded to the nitrogen to form a heterocyclic ring, such as pentamethylene and hexamethylene. The organic ester group, represented by X in the formula, may be the residue of an alcohol or of a phenol. Preferably, X represents an aromatic radical and, particularly, a nitroaryl radical.

By the term "alkyl," as employed hereinafter and in the claims, we mean an aliphatic radical which consists of carbon and hydrogen and which contains no aromatic rings. By the term "aliphatic," we mean that the radical may contain aromatic, as well as non-hydrocarbon substitutents. By an "accelerator" or an "accelerating" ester, we mean that the designated compound is effective alone to accelerate the vulcanization of rubber, i. e., in the absence of another organic accelerator. By a "residue" of an "alcohol" or a "phenol," we mean a radical formed by the elimination of the alcoholic or phenolic hydroxyl, the free valence of the radical being that otherwise satisfied by the hydroxy group. In the esters, the sulfur of the dithiocarbamic acid replaces an alcoholic or phenolic hydroxyl group. By an "aralkyl" group, we mean that the free valence belongs to a carbon of an aliphatic group, which aliphatic group carries, as a substitutent, an aromatic ring. By "aryl," we mean a group consisting of carbon and hydrogen in which the free valence belongs to a ring carbon atom in a benzene ring. By "aromatic," we mean to include "aryl" and benzenoid groups containing non-hydrocarbon substitutents, in which groups the free valence belongs to a ring carbon atom in a benzene ring.

In order to illustrate the remarkable properties that can be obtained from rubber treated according to our invention, results of tests, in which combinations of esters of dithiocarbamic acids with 2-mercapto-thiazolines have been used, are here described. The following stocks were compounded and used for these tests:

| Stock | X | Y |
|---|---|---|
| Smoked sheets | 100 | 100 |
| Zinc oxide | 5 | 5 |
| Stearic acid | 3 | 3 |
| Sulfur | 3 | 3 |
| 2-mercapto-thiazoline | 0.5 | 0.5 |
| 2,4-dinitrophenyl hexamethylene dithiocarbamate | | 0.25 |

Results of tests, on these stocks, are given in Table I.

TABLE I

| Min. cured | Temp. cured | Modulus at 600% elongation, lbs./sq. in. | | Tensile at break, lbs./sq. in. | |
|---|---|---|---|---|---|
| | | Stock X | Stock Y | Stock X | Stock Y |
| 30 | °F. 227 | 25 | 200 | 475 | 1,300 |
| 20 | 274 | 675 | 1,750 | 2,625 | 4,075 |
| 30 | 274 | 925 | 2,500 | 3,250 | 3,800 |
| 45 | 274 | 1,275 | 2,975 | 3,725 | 3,975 |
| 60 | 274 | 1,450 | 3,100 | 3,850 | 3,425 |

It can be seen that, by the addition of a small amount of an ester of a dithiocarbamic acid to a stock containing a 2-mercapto-thiazoline, a tremendous increase in modulus is obtained. This, however, is not accompanied by reversion in the longer cures or by serious loss of processing safety.

The results of tests, on other esters, are given in Table II. These tests were carried out on the following rubber stocks:

| Stock | A | B | C | D |
|---|---|---|---|---|
| Smoked sheets | 100 | 100 | 100 | 100 |
| Zinc oxide | 5 | 5 | 5 | 5 |
| Stearic acid | 3 | 3 | 3 | 3 |
| Sulfur | 3 | 3 | 3 | 3 |
| 2-mercapto-thiazoline | 0.5 | 0.5 | 0.5 | 0.5 |
| 2,4-dinitrophenyl-pentamethylene dithiocarbamate | | 0.25 | | |
| 2,4-dinitrophenyl-alpha-methyl-pentamethylene dithiocarbamate | | | 0.25 | |
| 2,4-dinitrophenyl-dibenzyl dithiocarbamate | | | | 0.25 |

TABLE II

| Min. cured | Temp. cured | Stock A | Stock B | Stock C | Stock D |
|---|---|---|---|---|---|
| MODULUS AT 600% ELONGATION, LBS./SQ.IN. | | | | | |
| 30 | °F. 227 | 100 | 200 | 250 | 175 |
| 20 | 274 | 675 | 1,350 | 1,675 | 1,250 |
| 30 | 274 | 875 | 1,950 | 2,025 | 1,750 |
| 45 | 274 | 1,175 | 1,975 | 2,325 | 2,150 |
| 60 | 274 | 1,375 | 2,200 | 2,450 | 2,425 |
| TENSILE AT BREAK, LBS./SQ. IN. | | | | | |
| 30 | 227 | 450 | 1,375 | 1,875 | 1,225 |
| 20 | 274 | 2,925 | 3,950 | 3,750 | 3,575 |
| 30 | 274 | 3,325 | 4,100 | 3,525 | 3,525 |
| 45 | 274 | 3,875 | 3,875 | 3,950 | 4,250 |
| 60 | 274 | 3,925 | 3,850 | 4,100 | 3,750 |

It can be seen from these tests that these esters have a powerful activating effect, the amount used doubling the modulus throughout the cure at 274° F.

In order to illustrate other desirable properties of these stocks, tear tests at room temperature and tensiles at 100° C. are presented in Tables III and IV. Stock F is stock A with the addition of 0.25 part of 2,4-dinitrophenyl furfuryl dithiocarbamate, stock G is stock A with the addition of 0.25 part of the ethyl chloroacetate ester of pentamethylene dithiocarbamic acid, stock H is stock A with the addition of 0.25 part of the chloroacetamide ester of cyclohexyl dithiocarbamic acid.

TABLE III

Tear test at 28° C.

| Min. cured at 274° F. | Stock A | Stock F | Stock G |
|---|---|---|---|
| 20 | 17 | 18 | 18 |
| 30 | 21 | 23 | 22 |
| 45 | 24 | 25 | 24 |
| 60 | 25 | 23½ | 26 |
| 90 | 24½ | 25½ | 25 |

TABLE IV

Tensiles in lbs./sq. in. determined at 28° C. and 100° C.

| Min. cured at 274° F. | Stock A | | Stock B | | Stock H | |
|---|---|---|---|---|---|---|
| | At 28° C. | At 100° C. | At 28° C. | At 100° C. | At 28° C. | At 100° C. |
| 20 | 2,925 | 2,250 | 3,950 | 3,800 | 2,525 | 2,950 |
| 30 | 3,325 | 2,850 | 4,100 | 3,775 | 2,975 | 2,525 |
| 45 | 3,875 | 2,900 | 3,875 | 4,025 | 3,400 | 2,800 |
| 60 | 3,925 | 3,625 | 3,850 | 4,100 | 3,575 | 3,175 |

These test results show that the stocks are not overcured and still retain excellent physical properties.

Not only do the vulcanizates, prepared according to our invention, possess excellent modulus and tensile properties, freedom from reversion, and processing safety, but they are also characterized by many other valuable properties which make them desirable commercial vulcanizates. Among these are excellent resistance to abrasion, to flex-cracking, to heat build-up and to tearing. Furthermore, these vulcanizates hold up very well when subjected to high temperatures. A further valuable property is the very great resistance toward aging possessed by the vulcanizates of our invention.

Although certain definite combinations of accelerators have been shown, these combinations are illustrative rather than limiting. A great many 2-mercapto-thiazolines may be used as the primary accelerator with excellent results. These include carbon substituted 2-mercapto-thiazolines in which one or both of the hydrogen atoms in the 4 or 5 or both 4 and 5 positions of the ring are substituted by alkyl groups or hydroxy alkyl groups as illustrated by the formula:

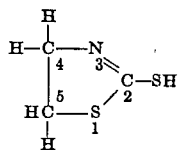

Examples of these are:

4-ethyl-2-mercapto-thiazoline
4-propyl-2-mercapto-thiazoline
4,4-dimethyl-2-mercapto-thiazoline
5,5-dimethyl-2-mercapto-thiazoline
4-methyl-4-ethyl-2-mercapto-thiazoline
4-methyl-5-propyl-2-mercapto-thiazoline
4,4-dimethyl-5-propyl-2-mercapto-thiazoline
4-isopropyl-5-propyl-2-mercapto-thiazoline
4-ethyl-5-propyl-2-mercapto-thiazoline
4-methyl-5-hydroxymethyl-2- mercapto - thiazoline
4-methyl-4-ethyl-5-propyl-2-mercapto-thiazoline
4-ethyl-5-methyl-2-mercapto-thiazoline
4-propyl-5-propyl-2-mercapto-thiazoline
4,5-dimethyl-2-mercapto-thiazoline
4-hydroxyethyl-2-mercapto-thiazoline
4,4,5,5-tetramethyl-2-mercapto-thiazoline Also, various metal salts of 2-mercapto-thiazolines may be used very effectively. These include, among others:

Lead salt of 2-mercapto-thiazoline
Cadmium salt of 2-mercapto-thiazoline
Iron salt of 2-mercapto-thiazoline
Zinc salt of 4-methyl-2-mercapto-thiazoline
Cadmium salt of 4-methyl-2-mercapto-thiazoline
Zinc salt of 4-ethyl-2-mercapto-thiazoline
Lead salt of 4-propyl-2-mercapto-thiazoline
Cadmium salt of 4,4-dimethyl-2-mercapto-thiazoline
Iron salt of 5,5-dimethyl-2-mercapto-thiazoline
Zinc salt of 4-methyl-4-ethyl-2-mercapto-thiazoline
Cadmium salt of 4,4-dimethyl-5-propyl-2-mercapto-thiazoline
Zinc salt of 4-hydroxyethyl-2-mercapto - thiazoline
Zinc salt of 4,4,5,5-tetramethyl-2-mercapto-thiazoline A great many different types of esters of dithiocarbamic acids have been disclosed as rubber accelerators. These are useful as secondary accelerators for 2-mercapto-thiazolines or their salts according to our invention. The preferred class of esters consists of those which undergo at least 25% complete hydrolysis when treated in the following manner.

0.002 mole of the ester is weighed into a 50 cc. Erlenmeyer flask, then 30 cc. of 95% ethanol and 0.002 mole of sodium hydroxide, in the form of an approximately N/10 solution, are added. The solution is brought to the boiling point as quickly as possible and kept there for exactly 30 minutes. It is then cooled quickly and titrated with approximately N/10 hydrochloric acid to a pH of 9.0, using a potentiometric indicator. Neutral alcohol and carbon dioxide free water should be used throughout. A blank should be run in order to determine the amount of acid necessary to neutralize the sodium hydroxide when no compound is used. The decrease, in hydroxyl ion content of the solution, is taken as a measure of the amount of hydrolysis that has taken place.

The preferred class of activators, i. e. those that undergo at least 25% hydrolysis under the above conditions, include the following:

2,4-dinitrophenyl dimethyl dithiocarbamate
2,4-dinitrophenyl dibenzyl dithiocarbamate
2,4-dinitrophenyl furfuryl dithiocarbamate
2,4-dinitrophenyl pentamethylene dithiocarbamate
2,4-dinitrophenyl alpha-methyl-pentamethylene dithiocarbamate
2,4-dinitrophenyl hexamethylene dithiocarbamate
2,4-dinitrophenyl dibutyl dithiocarbamate
Ethyl-chloroacetate ester of cyclohexyl dithiocarbamic acid
Ethyl-chloroacetate ester of diethyl dithiocarbamic acid
Ethyl-chloroacetate ester of alpha-methylpentamethylene dithiocarbamic acid
Ethyl-chloroacetate ester of pentamethylene dithiocarbamic acid
Chloroacetamide ester of dicyclohexyl dithiocarbamic acid
Chloroacetamide ester of cyclohexyl dithiocarbamic acid
Chloroacetamide ester of dimethyl dithiocarbamic acid
Chloroacetone derivative of pentamethylene dithiocarbamic acid
Chloroacetone derivative of dipropyl dithiocarbamic acid
Chloroacetone derivative of furfuryl dithiocarbamic acid
Chloroacetone derivative of alpha-methylpentamethylene dithiocarbamic acid The combinations of accelerators, employed in accordance with our invention, will generally comprise from about 1.5 parts to about 25 parts of the primary accelerator for each part of the secondary accelerator. Compounding ingredients and fillers, other than those shown in the test formulae and in other proportions, may also be used.

The combinations of accelerators herein described, namely combinations of esters of dithiocarbamic acids with 2-mercapto-thiazolines, are capable of producing highly desirable types of vulcanized rubber. These combinations produce stocks having very high moduli and tensiles, a fast flat cure at ordinary curing temperatures, and freedom from reversion. These qualities are not obtained at the expense of processing safety as the stocks have little tendency to prevulcanize or "scorch."

The vulcanized rubber, prepared according to our invention, has also exceedingly good resistance toward tear, abrasion, flex-cracking and heat build-up. Another characteristic of great value is the great resistance shown by these vulcanizates against deterioration by heat or oxidation. On the whole, the combination of the desirable properties, produced by the mixtures of accelerators of our invention, is one that is very difficult to duplicate with any other known accelerator or combination of accelerators.

We claim:

1. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating ester of a dithiocarbamic acid, as a secondary accelerator, there being from about 1.5 to about 25 parts of the primary accelerator to each part of the secondary accelerator.

2. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating ester of a dithiocarbamic acid derived from a secondary amine, as a secondary accelerator, there being from about 1.5 to about 25 parts of the primary accelerator to each part of the secondary accelerator.

3. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating ester of a dithiocarbamic acid derived from a secondary amine in which at least one radical attached to the nitrogen is an aliphatic radical, as a secondary accelerator, there being from about 1.5 to about 25 parts of the primary accelerator to each part of the secondary accelerator.

4. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating ester of a dialkyl dithiocarbamic acid, as a secondary accelerator, there being from about 1.5 to about 25 parts of the primary accelerator to each part of the secondary accelerator.

5. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating ester of dibenzyl dithiocarbamic acid, as a secondary accelerator, there being from about 1.5 to about 25 parts of the primary accelerator to each part of the secondary accelerator.

6. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating ester of a dithiocarbamic acid derived from a secondary amine in which two valences of the nitrogen are satisfied by the terminal carbon atoms of a single carbon chain, as a secondary accelerator, there being from about 1.5 to about 25 parts of the primary accelerator to each part of the secondary accelerator.

7. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating ester of a dithiocarbamic acid derived from a secondary amine in which two valences of the nitrogen are satisfied by the terminal carbon atoms of a single saturated carbon chain, as a secondary accelerator, there being from about 1.5 to about 25 parts of the primary accelerator to each part of the secondary accelerator.

8. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating ester of a dithiocarbamic acid derived from a secondary amine in which two valences of the nitrogen are satisfied by the terminal carbon atoms of a single saturated carbon chain of 5 to 6 carbon atoms, as a secondary accelerator, there being from about 1.5 to about 25 parts of the primary accelerator to each part of the secondary accelerator.

9. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating ester of hexamethylene dithiocarbamic acid, as a secondary accelerator, there being from about 1.5 to about 25 parts of the primary accelerator to each part of the secondary accelerator.

10. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating ester of pentamethylene dithiocarbamic acid, as a secondary accelerator, there being from about 1.5 to about 25 parts of the primary accelerator to each part of the secondary accelerator.

11. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating nitroaryl ester of a dithiocarbamic acid, as a secondary accelerator, there being from about 1.5 to about 25 parts of the primary accelerator to each part of the secondary accelerator.

12. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating dinitroaryl ester of a dithiocarbamic acid, as a secondary accelerator, there being from about 1.5 to about 25 parts of the primary accelerator to each part of the secondary accelerator.

13. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating dinitro phenyl ester of a dithiocarbamic acid, as a secondary accelerator, there being from about 1.5 to about 25 parts of the primary accelerator to each part of the secondary accelerator.

14. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating nitroaryl ester of a dithiocarbamic acid derived from a secondary amine, as a secondary accelerator, there being from about 1.5 to about 25 parts of the primary accelerator to each part of the secondary accelerator.

15. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating dinitrophenyl ester of a diaralkyl dithiocarbamic acid, as a secondary accelerator, there being from about 1.5 to about 25 parts of the primary accelerator to each part of the secondary accelerator.

16. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating dinitrophenyl ester of a dithiocarbamic acid derived from a secondary amine in which two valences of the nitrogen are satisfied by the terminal carbon atoms of a single carbon chain, as a secondary accelerator, there being from about 1.5 to about 25 parts of the primary accelerator to each part of the secondary accelerator.

17. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating dinitrophenyl ester of a dithiocarbamic acid derived from a secondary amine in which two valences of the nitrogen are satisfied by the terminal carbon atoms of a single saturated carbon chain of 5 to 6 carbon atoms, as a secondary accelerator, there being from about 1.5 to about 25 parts of the primary accelerator to each part of the secondary accelerator.

18. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and 2,4-dinitrophenyl-hexamethylene-dithiocarbamate, as a secondary accelerator, there being from about 1.5 to about 25 parts of the primary accelerator to each part of the secondary accelerator.

19. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and 2,4-dinitrophenyl-pentamethylene-dithiocarbamate, as a secondary accelerator, there being from about 1.5 to about 25 parts of the primary accelerator to each part of the secondary accelerator.

20. Rubber having incorporated therein, prior to vulcanization, 2-mercapto-thiazoline, as a primary accelerator, and an accelerating ester of a dithiocarbamic acid, as a secondary accelerator, there being from about 1.5 to about 25 parts of the primary accelerator to each part of the secondary accelerator.

21. Rubber having incorporated therein, prior to vulcanization, 2-mercapto-thiazoline, as a primary accelerator, and an accelerating ester of a dithiocarbamic acid derived from a secondary amine in which at least one radical attached to the nitrogen is an aliphatic radical, as a secondary accelerator, there being from about 1.5 to about 25 parts of the primary accelerator to each part of the secondary accelerator.

22. Rubber having incorporated therein, prior to vulcanization, 2-mercapto-thiazoline, as a primary accelerator, and an accelerating ester of a dithiocarbamic acid derived from a secondary amine in which two valences of the nitrogen are satisfied by the terminal carbon atoms of a single saturated carbon chain of 5 to 6 carbon atoms, as a secondary accelerator, there being from about 1.5 to about 25 parts of the primary accelerator to each part of the secondary accelerator.

23. Rubber having incorporated therein, prior to vulcanization, 2-mercapto-thiazoline, as a primary accelerator, and an accelerating ester of pentamethylene dithiocarbamic acid, as a secondary accelerator, there being from about 1.5 to about 25 parts of the primary accelerator to each part of the secondary accelerator.

24. Rubber having incorporated therein, prior to vulcanization, 2-mercapto-thiazoline, as a primary accelerator, and an accelerating dinitro phenyl ester of a dithiocarbamic acid, as a secondary accelerator, there being from about 1.5 to about 25 parts of the primary accelerator to each part of the secondary accelerator.

25. Rubber having incorporated therein, prior to vulcanization, 2-mercapto-thiazoline, as a primary accelerator, and an accelerating dinitrophenyl ester of a dithiocarbamic acid derived from a secondary amine in which two valences of the nitrogen are satisfied by the terminal carbon atoms of a single saturated carbon chain of 5 to 6 carbon atoms, as a secondary accelerator, there being from about 1.5 to about 25 parts of the primary accelerator to each part of the secondary accelerator.

26. Rubber having incorporated therein, prior to vulcanization, 2-mercapto-thiazoline, as a primary accelerator, and 2,4-dinitrophenyl-pentamethylene-dithiocarbamate, as a secondary accelerator, there being from about 1.5 to about 25 parts of the primary accelerator to each part of the secondary accelerator.

27. Rubber having incorporated therein, prior to vulcanization, 2-mercapto-thiazoline, as a primary accelerator, and an accelerating dinitrophenyl ester of a diaralkyl dithiocarbamic acid, as a secondary accelerator, there being from about 1.5 to about 25 parts of the primary accelerator to each part of the secondary accelerator.

28. Rubber having incorporated therein, prior to vulcanization, 2-mercapto-thiazoline, as a primary accelerator, and 2,4-dinitrophenyl-dibenzyl dithiocarbamate, as a secondary accelerator, there being from about 1.5 to about 25 parts of the primary accelerator to each part of the secondary accelerator.

ARTHUR M. NEAL.
BERNARD M. STURGIS.